United States Patent
Bisceglia et al.

(12)

(10) Patent No.: US 6,275,498 B1
(45) Date of Patent: Aug. 14, 2001

(54) EXTENDED PHY ADDRESSING

(75) Inventors: Brian Bisceglia, Holden; David S. Miller, Framingham, both of MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/044,403

(22) Filed: Mar. 19, 1998

(51) Int. Cl.[7] .................................................. H04Q 11/00
(52) U.S. Cl. ........................ 370/438; 370/469; 370/475
(58) Field of Search ................................... 370/438, 469, 370/475

(56) References Cited

U.S. PATENT DOCUMENTS 5,485,456 * 1/1996 Shtayer et al. ........................ 370/60
5,889,778 * 3/1999 Huscroft et al. ..................... 370/395
5,978,853 * 11/1999 Crayford et al. .................... 709/245

\* cited by examiner

*Primary Examiner*—Melvin Marcelo
(74) *Attorney, Agent, or Firm*—Weingarten, Schurgin, Gagnebin & Hayes LLP

(57) ABSTRACT

A method and apparatus is disclosed for extending PHY addressing in a telecommunications device beyond the number of PHYS that may be directly addressed over a bidirectional serial management control bus using a management bus protocol employing a predetermined number of address bits for PHY addressing. A plurality of serial bidirectional management control buses are provided and plural PHYS are coupled to each of the buses. A control processor is employed in conjunction with control logic to select one of the plurality of management control buses as the active bus at any one time to permit communication between the processor and a selected PHY on the respective bus. State machines within the programmable array logic are employed to selectively enable buffers within the control logic to allow the processor to write information to a PHY on a selected control bus or alternatively, to allow the processor to read information from a PHY on a selected control bus. In the above described manner, any desired number of PHYS may be addressed by a single control processor within the telecommunications device. Additionally, a serial peripheral channel within the processor is employed to offload the processor from control bus management functions. The serial peripheral channel is loaded by the control processor and the channel manages the serial communication over the control bus. In this manner, the bandwidth of the processor is available for port management and statistics gathering functions.

17 Claims, 5 Drawing Sheets

EXTENDED PHY ADDRESSING

CROSS REFERENCE TO RELATED APPLICATIONS

None

STATEMENT REGARDING FEDERALLY SPONSORED RESEARCH

Not Applicable

BACKGROUND OF THE INVENTION

The present invention relates to telecommunications devices and more particularly, to a method and apparatus to permit access to and control over a greater number of PHYS than may be directly addressed using the Media Independent Interface protocol for direct PHY addressing.

Telecommunications devices such as bridges, routers and switches typically have a plurality of ports for connecting the device to different networks or subnetworks. Each port usually has at least one media access controller (MAC) for controlling access to the media in accordance with a predetermined network protocol. The MAC associated with a network protocol, such as the ethernet or fast ethernet protocol, interface to the physical media via logic which is known in the art as a PHY. The PHYS performs a number of interface functions. In particular, in the ethernet environment, the PHY performs a parallel to serial conversion of data forwarded by the MAC to the PHY and performs 4B to 5B encoding of such data to assure DC balance on the media. Furthermore, the PHY generates tri-level encoding of data, such as the MLT3 levels employed with 100Base-T. The PHY also receives the serial data stream from the media and converts the received serial data stream to a parallel data stream which is forwarded to the MAC. During the serial to parallel decoding, the PHY performs necessary 5b to 4b decoding of the received serial data stream.

The PHYS are controlled via a bidirectional serial management control bus such as the Media Independent Interface (MII) Management Interface specified in the IEEE Std 802.3u-1995 published by the Institute of Electrical and Electronic Engineers, Inc., New York, N.Y 10017 (2nd printing, Corrected Edition, Approved by the IEEE Standards Board Jun. 14 1995), which specification is incorporated herein by reference. The MII Management Interface Protocol is also described in a data sheet describing a commercially available component which is employed to implement PHYS in ethernet ports. The component is identified as the LXT970 Fast Ethernet Transceiver and is available from Level One Communications of Sacramento, California and is described in a data sheet bearing a copyright date of 1997, titled LXT970 Fast Ethernet Transceiver Data Sheet, which data sheet is incorporated herein by reference.

The MII Management Interface comprises a control bus and a protocol which permits the forwarding of control messages and information to a specified PHY from a processor and further permits the processor to access information within registers of PHYS coupled to the control bus. Each PHY which is coupled to the management control bus is assigned a five bit address which is used to identify the PHY. As a consequence of the five bit address limitation within the MII Management Interface specification, it is only possible to directly address 32 PHYS over a single management control bus. The five bit address limitation within the management control bus protocol presents an undesirable limitation on the number of PHYS which may be addressed via a single processor.

Port setup, management and statistics gathering operations within a telecommunications devices are often performed by an application processor which comprises a high-speed microprocessor. The processor employed to perform such functions is also typically employed to manage the PHYS within the device and thus must manage the transmission and reception of information over the management control bus. Burdening the processor with software control of the MII Management Bus operations can limit the available bandwidth of the processor to service and manage port configuration and statistics gathering functions. It would therefore be desirable to be able to allow a processor to manage the MII management bus transfers without using an inordinate amount of processor bandwidth for this purpose.

BRIEF SUMMARY OF THE INVENTION

In accordance with the present invention, a method and apparatus are disclosed for extending the addressing capabilities of a serial bidirectional PHY control bus, such as an MII Management Control Bus. Extension of the addressing capabilities of the control bus permits a single control processor to address a greater number of PHY interfaces than is possible given a fixed number of address bits specified within the MII Interface Specification. More specifically, a control processor is coupled to a plurality of bidirectional serial management control buses via programmable array logic. The programmable array logic is employed to direct information and control messages from the control processor to the appropriate Management Control Bus and to permit information to be retrieved from a PHY coupled to one of the buses. Selection signals from the control processor are used to select one of the plurality of control buses as the operative management bus. Finite state machines within the programmable array logic generate signals to selectively enable and disable drivers and receivers for the respective Management Control Buses so as to permit data flow in the proper direction through the programmable array logic. By addressing PHYS over a plurality of management buses, a single control processor may control more PHYS then can be addressed with the limited number of address bits specified within the management bus protocol.

Additionally the control processor drives a selected serial management bus through a serial peripheral interface (SPI) provided in the processor. The control processor has a clock speed many times greater than the clock speed of the management bus. To avoid unduly burdening the control processor with the software overhead needed to manage communications over the control bus directly at a significantly lower clock speed than the speed at which the control processor operates, information to be transmitted over a management bus is loaded by the control processor into the serial peripheral interface within the control processor. The serial peripheral interface then manages the information exchange over the respective Management Control Bus without further processor intervention. In this manner, the serial peripheral interface may be efficiently configured by the control processor and the serial peripheral interface can manage the information exchange between the SPI and the PHY independent of the control processor. The control processor bandwidth is thereby made available to perform configuration, port management and statistics monitoring functions pertaining to network ports controlled by the processor.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Figure 1:
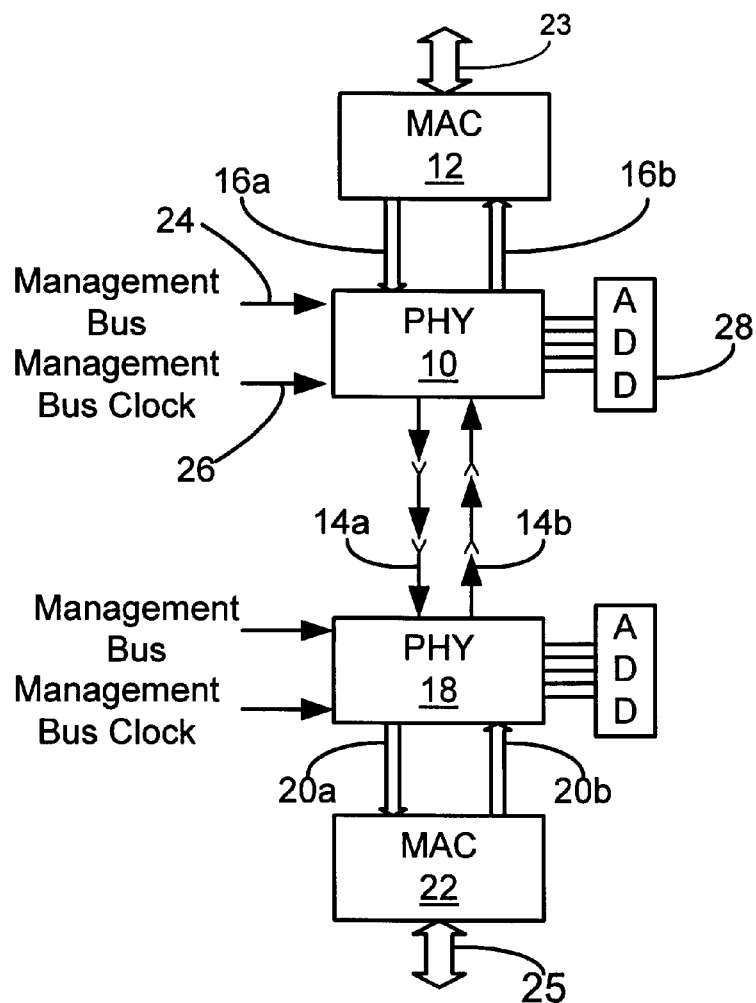
FIG. 1 is a block diagram illustrating the coupling of media access controllers to a network media via PHYS as known the art.

A block diagram illustrating the use of a physical interface known as a PHY 10 to couple a Media Access Controller (MAC) 12 to the network media 14 of a computer network as known in the art is depicted in FIG. 1. While FIG. 1 depicts one MAC associated with a port within a telecommunications device, such as a bridge or router, a number of ports (not shown, each having at least one MAC and at least one associated PHY are typically provided within such a device. Data units intended from transmission on the network media are communicated from the MAC 12 to the PHY 10 over a paralled bus 16a. The PHY 10 converts the paralled information received over the paralled bus 16a into a serial data stream for transmission over the network media 14a. Depending upon the protocol and physical configuration of the media, the transmit media 14a and the receive media 14b may be one and the same media. The information transmitted by the PHY 10 over the media 14a is received by another PHY 18 as a serial data stream and converted into parallel data. The parallel data is forwarded over parallel bus 20a for handling by a MAC 22. Each MAC is a part of a port via which data units are transmitted and received. Accordingly, buses 23, 25 are associated with each MAC to indicate that the MAC is in communication with associated port logic (not shown).

The MII interface specification includes an MII data interface specification which describes data communications between the MAC and the network media and an MII Management Interface which describes the control interface for the PHYS. More specifically, the MII Management Interface allows for the control of each of the PHYS and for retrieving information from each of the PHYS. The signals comprising the MII Management Interface include a Management Bus 24 or data line and a Management Bus Clock 26. The MII Management Interface allows for information to be written from a processor to one of the PHYS over the Management Bus 24 or to be read by the processor from the PHYS over the Management Bus.

The PHYS receive messages from a control processor (not shown in FIG. 1) and provide information to the control processor upon recognition of a read command addressed to the respective PHY. The PHYS operate in accordance with the Media Independent Interface (MII) specification when operating in accordance with the IEEE 802.3 specification applicable to ethernet and fast ethernet transmission.

The frame structure defined in the MII Interface Specification commences with a Preamble comprising 32 ones. The Preamble is followed by a 2 bit Start of Frame Delimiter (SFD) and the SFD field is followed by a 2 bit OP Code. A value of "10" in the OP Code field specifies a read frame structure and a value of "01" in the OP Code field specifies a write frame structure. A five (5) bit PHY Address field follows the OP Code field. The PHY Address field is employed to specify the address of the PHY for the respective read or write operation. Since the PHY Address field is limited to 5 address bits, only 32 PHYS may be addressed on a single MII compliant Management Bus. The PHY address field is followed by a five (5) bit register address. The register address specifies the address of the register within the PHY which is to be read (if the operation is a read operation) or the register to which the data is to be written (if the operation is a write operation). Each PHY has a hard wired address 28 which defines the address for the respective PHY. In accordance with the MII Interface specification, because the addresses are specified by a five bit field, the addresses for the PHYS range from 0 through 31. The register address field is followed by a two (2) bit turn around field and then by a sixteen (16) bit data field.

Each PHY address denotes the address on the respective Management Control Bus to which the respective PHY will respond. The PHY address for each PHY coupled to a management control bus is typically hard wired. Each PHY compares its PHY address to the PHY address appearing on the management control bus and ignores the message if the address contained in the message is not the same as the specified address of the respective PHY.

Figure 3:
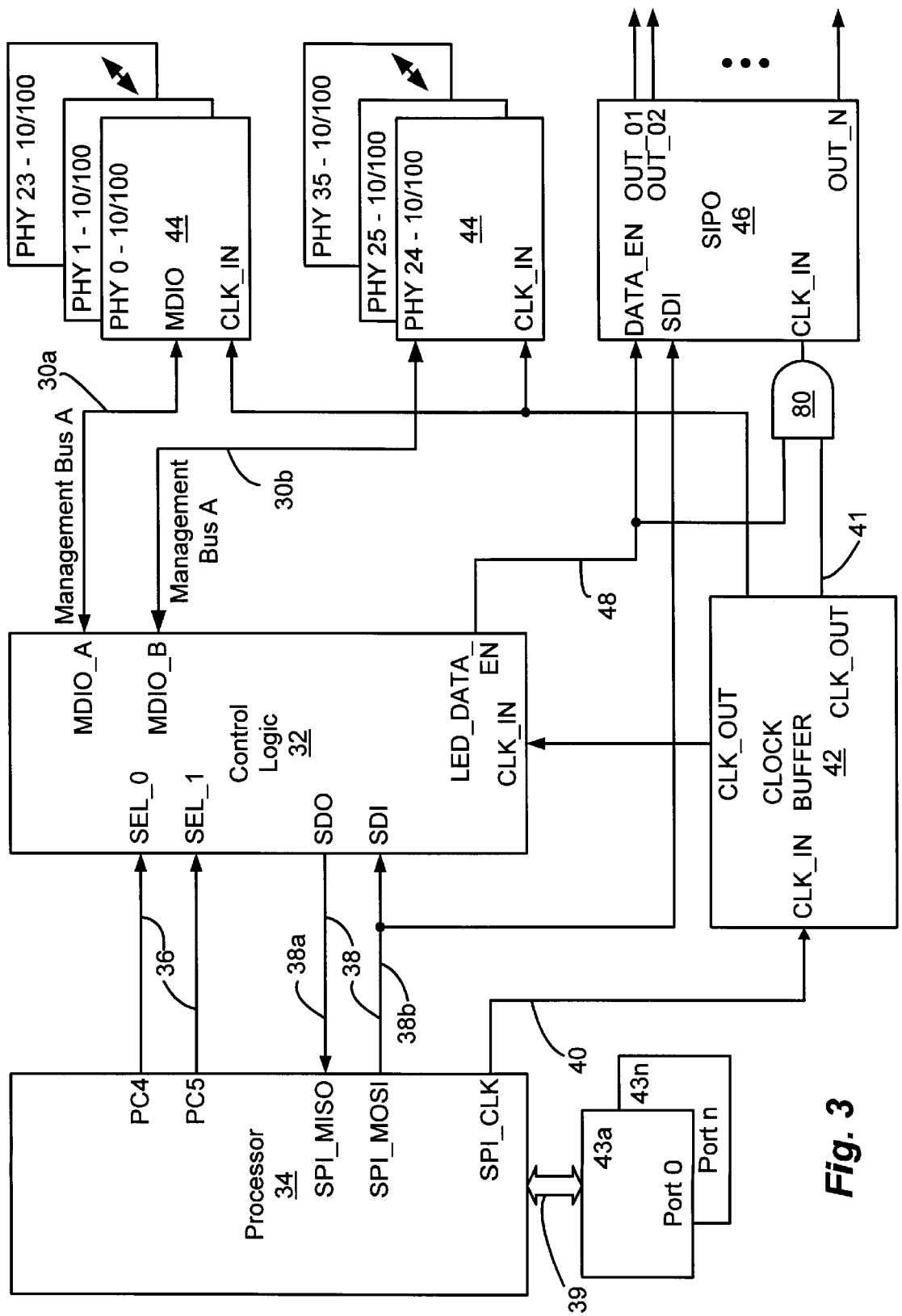
FIG. 3 is a block diagram illustrating the use of a single processor which is selectably coupleable to plural Management Control Buses in accordance with a present invention.

In accordance with the present invention, a method and apparatus are disclosed for extending the addressing capabilities beyond the number of PHYS that may be directly addressed given the limitations of MII Interface specification addressing. Referring to FIG. 3, a plurality of bidirectional serial Management Buses, such as Management Control Buses A and B, numbered 30a and 30b respectively, are coupled to control logic 32. Up to a maximum of thirty two (32) PHYS 44 may be coupled to each Management Control Bus in the illustrated embodiment given the 5 bit address limitation within the MII protocol. In the illustrated embodiment, Management Bus A is coupled to 24 PHYS labeled PHY 0 through PHY 23 and Management Bus B is coupled to 12 PHYS labeled PHY 24 through PHY 35, however any number of desired Management Control Buses may be provided servicing any number of PHYS, provided that no more than the maximum number of PHYS that can be addressed in the specific PHY management protocol may be attached to any given Management Control Bus. The ports associated with the respective PHYS are coupled to a crosspoint switch to permit the forwarding of data units from an input port to one or more output ports within the telecommunications device.

A processor 34, which may comprise a microprocessor, or microcontroller or any other suitable controller, interfaces to the control logic 32. In the illustrated embodiment, the processor comprises an MPC860 processor (available from Motorola, Inc.) having a general purpose input output (GPIO) interface and a serial peripheral interface (SPI) which will be described subsequently in greater detail.

Select lines 36 are driven by the processor 34 GPIO interface outputs PC4 and PC5. The select lines are decoded and among other functions, serve to select which one of the plurality of management buses coupled to the control logic 32 is the active management bus at any given time. The functions associated with the decoding of the inputs SEL__0 and SEL__1 are indicated in Table 1 below.

TABLE 1

| SEL__0 | SEL__1 | Function |
|---|---|---|
| 0 | 0 | Enable Management Bus A |
| 0 | 1 | Enable Management Bus B |
| 1 | 0 | LED__DATA__EN__H |
| 1 | 1 | Reset Control Logic Transmit 32 ones for Preamble |

A bidirectional interface 38 comprising the SPI channel is provided between the processor 34 and the control logic 32 to permit transmission of MII interface compliant messages from the processor to the control logic and to permit the receipt of information back from the PHYS via the control logic 32. When the select lines 36 are driven by the processor GPIO PC4 and PC5 outputs, for example, to select management bus A, communication is permitted between the processor 34 and PHYS coupled to management bus A via the control logic 32 as hereinafter described. Similarly, when the select lines 36 are driven by the GPIO processor 34 interface to select management bus B as the active management bus, the processor may transmit messages to and receive information from PHYS coupled to management bus B.

The processor 34 provides a clock output signal SPI__CLK 40 which is coupled to a clock buffer 42. Buffered clock signals are coupled to the control logic 32, each of the PHYS 44 and to a Serial In Parallel Out (SIPO) Light Emitting Diode (LED) drive circuit 46. No single clock buffer output drives more than two PHYS to minimize undesirable loading effects on the respective clock outputs.

The control logic 32 decodes the SEL__0 and SEL__1 inputs and generates an LED__DATA__EN signal which comprises a data enable signal 48. The data enable signal 48 is coupled to the Serial In Parallel Out (SIPO) drive circuit 46 and will be discussed subsequently in connection with the operation of the SIPO LED drive circuit.

Figure 4:
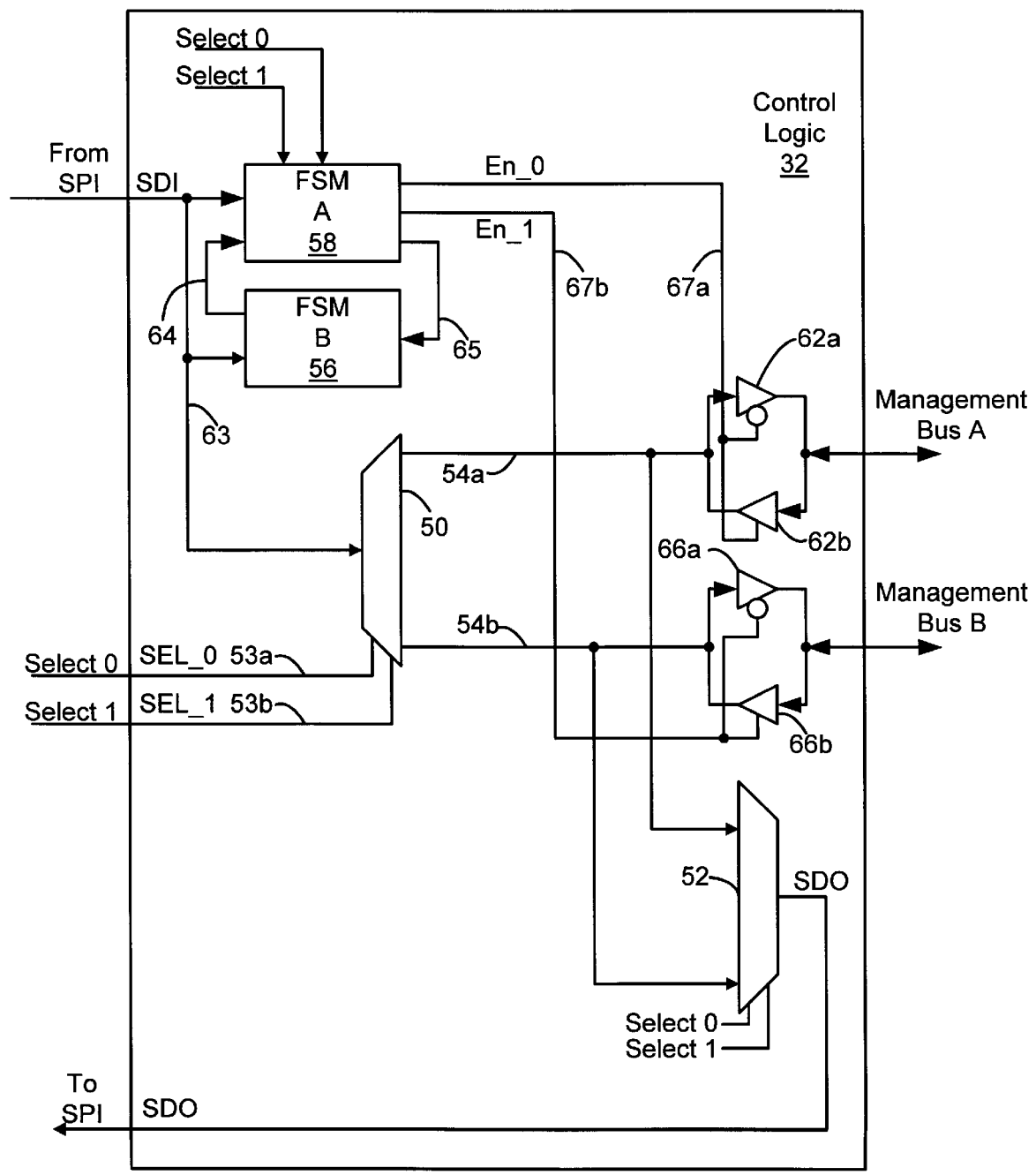
FIG. 4 is a block diagram illustrating the control logic of FIG. 3 in greater detail.

The control logic 32 is illustrated in greater detail in FIG. 4. The primary functions of the control logic are to facilitate the communication of information between the processor and PHYS coupled to the plural Management Control Buses. By selectively coupling one of the management buses to the processor at any one time, the processor can communicate with the PHYS coupled to the selected Management Control Bus and thus allow the processor 34 to communicate with more than the limited number of PHYS 44 that can be directly addressed in accordance with the MII interface specification protocol.

Figure 2A:
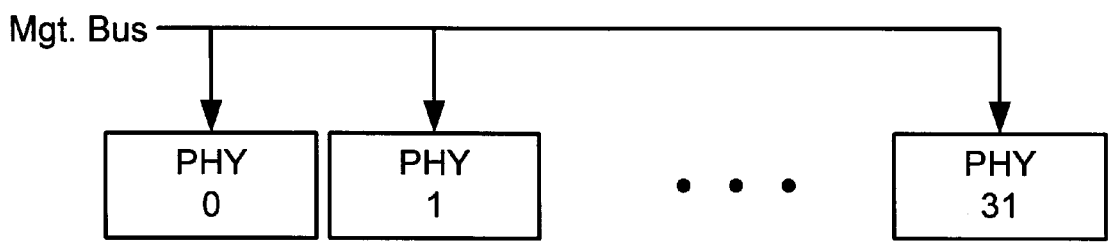
FIG. 2a is a block diagram illustrating 32 PHYS coupled to an MII Management Bus as known the art.
Figure 2B:
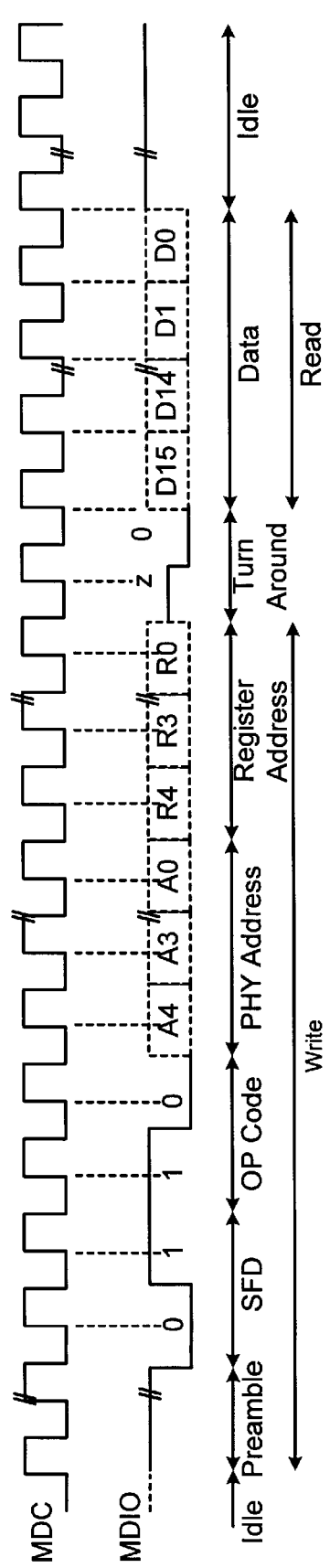
FIG. 2b is a timing diagram illustrating the Read Frame Structure timing in accordance with the Media Independent Interface protocol specification as known in the art.
Figure 2C:
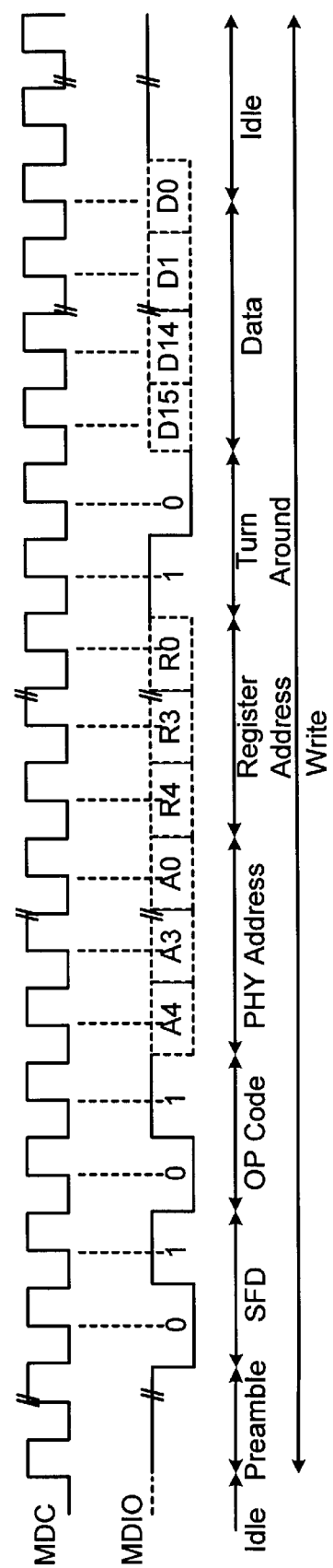
FIG. 2c is a timing diagram illustrating the Write Frame Structure and timing in accordance with the Media Independent Interface protocol specification as known in the art.

Operation of the control logic 32 may be illustrated with respect to a write operation, as depicted in FIG. 2c and a read operation as depicted in FIG. 2b. Assuming that the processor desires to write information to one of the PHYS attached to Management Control Bus A, the processor drives the control logic input SEL__0 to 1 and the SEL__1 input to 1 to reset the control logic 32 and to initiate the transmission of the Preamble by Finite State Machine A over both Management Control Buses. The processor next drives SEL__0 to a 0 and the SEL__1 line to a 0 as indicated above in Table 1 to select Management Control Bus A. Such causes the demultiplexer 50 to couple data appearing at the serial data in (SDI) line of control logic 32 to the output line 54a of the demultiplexer 50 which in turn is coupled to the input to the driver 62a associated with Management Bus A. Additionally, driving SEL__0 to 0 and SEL__1 to 0 causes multiplexer 52 to couple data appearing on the input line 54a of the multiplexer 52 to the serial data output (SDO) line of the multiplexer 52.

The Processor 34 then transmits the balance of the message (subsequent to the Preamble) out of the SPI via signal line 38b to the control logic 32. The message is received at the SDI input of the control logic and coupled via signal line 63 to Finite State Machine A 58 and Finite State Machine B 56. Finite State Machine A monitors the received message fields and signals Finite State machine B over signal line 65 when the OP Code field of the message is present on the data SDI line 63. In response to receipt of the control signal 65 indicating the presence of the OP code, Finite State Machine B reads and decodes the OP Code field and generates a signal 64 which indicates whether the transfer initiated by the processor 34 involves a write operation or a read operation. Assuming that the operation is a write operation, Finite state machine B 56 signals Finite State Machine A via signal line 64 that the operation is a write operation and Finite State Machine A enables the appropriate driver; i.e. driver 62a or 66a for the associated Management Control Bus. In the present example, in which the processor is performing a write operation to Management Bus A, Finite State Machine A enables driver 62a and disables driver 62b for the duration of the message. The drivers and receivers for the non-selected control bus are disabled following transmission of the Preamble information.

In the event that the MII interface message involves a write operation to Management Bus B, the processor first drives control logic inputs SEL__0 and SEL__1 both to is as discussed above to reset the control logic and initiate transmission of the Preamble. The SEL__0 and SEL__1 lines are next driven by the processor as indicated in Table 1 ("01") to select Management Control Bus B. Consequently, driver 66a is activated rather than driver 62a and the message is transmitted over Management Bus B for receipt by the PHY addressed within the respective message.

While selection of one of two management buses is illustrated, it should be appreciated that by driving additional selection decodes, the processor may select one of any number of desired Management Control Buses to allow any desired number of PHYS to be addressed and controlled via the single processor 34.

If the processor is to obtain information from a PHY over Management Bus A via a read command, the processor first drives the SEL__0 and SEL__1 lines both to 1 to reset the control logic 32 and initiate transmission of the Preamble over the Management Control Buses. The processor next drives SEL__0 to 0 and SEL__1 to 0 via the GPIO lines PC4 and PC5 to select Management Bus A. Thereafter, the processor 34 forwards the subsequent portion of the read frame (after the Preamble and through the turn around signal) over signal line 38b to the SDI input of the control logic 32 in accordance with the read frame format illustrated in FIG. 2b. The driver 62a is initially enabled by Finite State Machine A and the initial portion of the message is transmitted to the addressed PHY on Management Bus A. The message is monitored by Finite State Machine A 58 which provides control signal 65 to Finite State machine B to indicate the presence of the OP Code field on the signal line 63. In response to the OP Code indicator signal 65, Finite State Machine B reads and decodes the message OP Code and signals Finite State Machine A via signal line 64 that the message comprises a read operation. In response to the indication over signal line 64 that the operation is a read operation, Finite State Machine A disables the Management Bus A driver 62a upon detection of the turn around field identified in FIG. 2b, and enables the Management Bus A receiver 62b. The read data is then conveyed from the addressed PHY over Management Bus A through the receiver 62b to the associated input of the multiplexer 52. The read data is driven out of the SDO output of the multiplexer 52 and over the signal line 38a for receipt at the SPI_MISO input of the processor 34. Thus, the processor 34 can specify which control bus it desires to employ in connection with a read operation and address any one of the PHYS on each of the plural Management Control Buses.

If the processor is to obtain read information from a PHY over Management Bus B, the processor first drives the SEL_0 and SEL_1 inputs of the control logic 32 to 1 to reset the control logic and cause the transmission of the read frame Preamble. The processor 34 next drives the SEL_0 and SEL_1 lines to select Management Bus B by driving the respective GPIO lines PC4 and PC5 as indicated in Table 1. Thereafter, the processor 34 forwards the portion of the read frame subsequent to the Preamble and through the turn around signal to the control logic 32 over the SPI data output line 38b. The read frame includes the address of the PHY from which data is desired to be retrieved. Processing proceeds as discussed above with respect to Management Bus A, noting however that driver 66a is enabled during the initial portion of the read operation to permit the read message to be transmitted to the respective PHY on Management Control Bus B and receiver 66b is enabled upon detection of the turn around signal by Finite State Machine A to permit the read data to be conveyed via the control logic 32 to the processor 34. The drivers and receivers of the non-selected Management Control bus are disabled.

In the foregoing manner, information may be communicated from the processor 34 to any PHY coupled to any one of the plurality of management control buses and information may be retrieved from any one of the PHYS coupled to the plurality of Management Control buses. Thus, more PHYS may be supported by the single processor 32 that may be directly addressed in accordance with the MII interface specification protocol.

While any suitable processor may be employed, in a preferred embodiment, the integrated communications controller identified as the MPC860 processor was used due to the benefits that derive from the utilization of the serial peripheral interface which is integrated within such processor. The control logic 32 may be fabricated as programmable array logic, in an Application Specific Integrated Circuit, discretely or via any other suitable fabrication technique. While in a preferred embodiment and LXT970 PHY interface device was utilized, any suitable PHY interface may also be employed.

Figure 5:
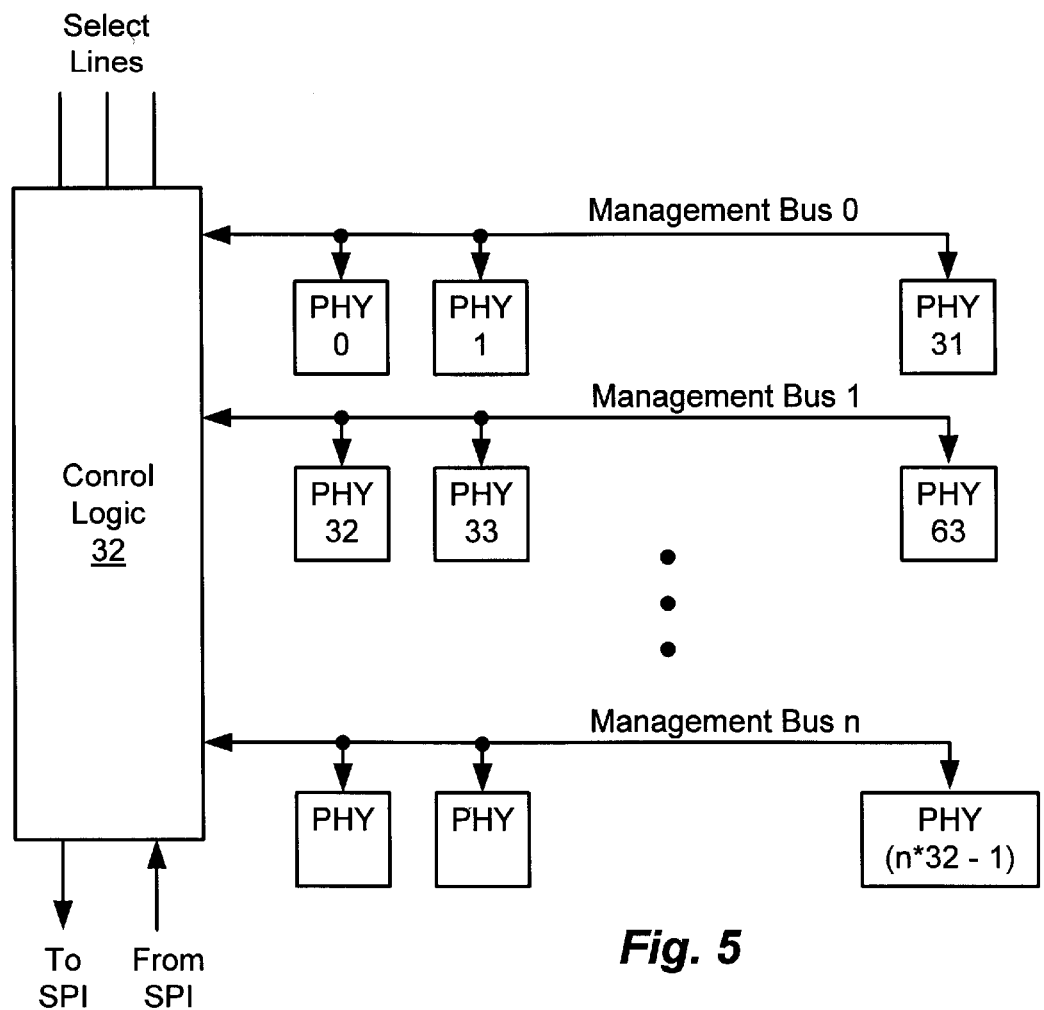
FIG. 5 is a block diagram illustrating the technique for controlling n MII management buses via a single application processor so as to permit the processor to control any desired number of PHYS.

PHY address expansion in accordance with the presently disclosed technique is further illustrated in FIG. 5 in which management buses 0 through n are coupled to a processor (not shown) via the control logic 32. Multiple PHYS are illustrated as being coupled to each of the n management buses.

Figure 6:
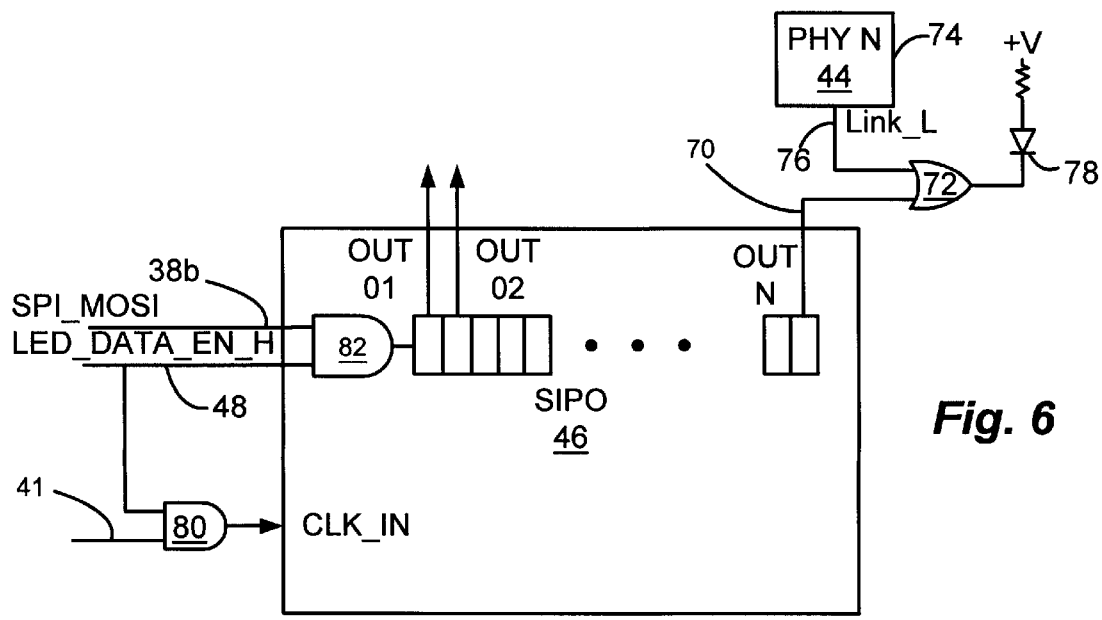
FIG. 6 is a diagram illustrating a light emitting diode drive circuit for providing a visual indication of PHY status.

Referring to FIGS. 3 and 6, the SPI interface associated with the processor 34 is also employed to drive the Serial In Parallel Out (SIPO) 46 Light Emitting Diode drive circuit. The SIPO 46, which may comprise a commercially available 74LV164 driver available from Texas Instruments, Inc., receives as inputs a data message from the processor 34 over signal line 38b, a data enable signal LED_DATA_EN_H 48 from the control logic 32. The SIPO 46 further has a clock input CLK_IN which is coupled to the output of an AND gate 80. The AND gate 80 receives as one input a buffered SPI_CLK signal 41 and receives as a second input the LED_DATA_EN_H signal 48 from the control logic 32. As indicated above, the LED_DATA_EN_H signal is high in response to a decode of the SEL_0 and SEL_1 lines as indicated in Table 1.

Upon enabling AND gate 80 and AND gate 82 (internal to the 74LV164 employed to implement the SIPO) data from the processor is clocked into the SIPO which comprises a serial in parallel out shift register having 40 parallel outputs. In the presently disclosed embodiment, the first 4 bit locations within the 40 bit shift register driving the 40 parallel outputs are not used. When the LED_DATA_EN_H signal is low, data is not clocked into the shift register within the SIPO. Thus, the outputs 70 from the SIPO 46 will remain constant unless data is loaded into the shift register within the SIPO via appropriate activation of control lines 36 and clocking of data into the register. SIPO's 46 may be ganged to achieve the desired number of outputs. Each output is coupled to a LED activation circuit, one of which is illustrated in FIG. 6. More specifically, the parallel output from each stage of the shift register within the SIPO 46 comprises a signal 70 which is coupled to one input of an OR gate 72. The other input of the OR gate 72 is coupled to an output signal 76 from a PHY 44. The PHY 44 output signal, designated Link_L, is low when the respective PHY has successfully negotiated with a corresponding PHY coupled to the other end of the media. The output of the OR gate 72 is coupled the cathode of a light emitting diode (LED) 78 and the anode of the LED is coupled to a positive voltage source +V through a resistive element 74.

When the output signal from the SIPO 70 is low (enabling) the input signal 76 to the OR gate controls the activation of the LED. Thus, if the input signal 76 is low, the LED 78 will be on when the Link_L signal 76 is low and the LED 78 will be off when the Link_L signal 76 is high.

Data which controls the enabling and disabling of the respective LED circuits is shifted into the shift register by the processor by driving the SEL_0 and SEL_1 lines to enable the shifting of data into the register via signal line 38b. In the foregoing manner, the SPI processor interface and GPIO interface is also efficiently employed to permit enabling and disabling of a visual indication of PHY status via the presently disclosed LED drive mechanism.

It is also desirable to utilize the processor to perform port control and configuration functions and port statistics gathering functions in addition to the use of such processor for the above described MII Management Control and LED display control functions. The bandwidth that would be utilized to service the MII Management Control bus would not, however, normally permit the efficient use of the processor to perform Port administration functions. Accordingly, the properties of the SPI interface have been employed to allow the processor 32 to service the Management Control Buses without overburdening the processor so as to permit the processor also to perform Port administration functions.

When the processor needs to transmit a control message to a PHY or obtain information from a PHY it configures the SPI to perform the operation and then allows the SPI to perform the specified operation independent of the processor. More specifically, when the processor desires to transmit a message to a PHY it sets up a transmit port descripter which specifies the transmit message. If data is to be received in response, the processor also sets up a receive port descripter which specifies the location in which to store the received data from the respective PHY. The processor next performs a write to a control register to initiate the transmission of the message via the SPI. Once the processor sets up the descripters and initiates the transmission of the message, it decouples from the SPI transmission and is free to perform other processing such as port configuration, administration and statistics gathering functions.

The SPI clocks out the message using a 1 MHz clock, a rate which, in a preferred embodiment, is substantially less that the processor clock rate of 25 MHz. To transmit the PHY control message, the SPI utilizes 32 1 mhz clock cycles to shift out a 32 bit word. During this time interval, the processor can perform many operations that would not be possible if it were controlling the Management Control Bus via an executable program on a cycle by cycle basis.

Upon completion of the respective operation, the SPI interface signals the processor via an interrupt that the operation has been completed. The processor can then initiate a write operation, access information received in response to a read command, or initiate a read operation without directly controlling the transmission and reception of the data. Such utilization of the SPI interface greatly enhances the efficiency of the processor and permits the single processor to manage the plural Management Control Buses and additionally perform port administration functions within the telecommunications device.

It will be apparent to those of ordinary skill in the art that modifications to and variations of the above described methods and apparatus are possible without departing from the inventive concepts described herein. Accordingly, the invention is to be viewed as limited solely by the scope and spirit of the following claims.

What is claimed is:

1. Apparatus for addressing a greater number of PHYS in a telecommunications device than may be directly addressed using PHY management messages employing a predetermined number of address bits for PHY addressing, said apparatus comprising:
    a controller operative to produce bus selection output signals;
    control logic, said controller coupled to said control logic via a serial link and operative to transmit information to said control logic via said serial link employing said PHY management messages and to receive data from said control logic over said serial link;
    a plurality of serial bidirectional control buses coupled to said control logic;
    at least one PHY coupled to each of said plurality of control buses wherein the number of PHYS coupled to each of said plurality of management control buses is equal to or less than the number of PHYS which may be addressed using said predetermined number of address bits in said PHY management messages;
    said control logic being responsive to said bus selection output signals to selectively couple one of said plurality of serial bidirectional control buses to said serial link to permit addressed message communication from said controller to a specified one of said at least one PHY coupled to the respective selectively coupled serial bidirectional control bus.

2. The apparatus of claim 1 wherein said serial link comprises a first unidirectional link for transmission of messages from said controller to said control logic and a second unidirectional link for transmission of data from said, control logic to said controller.

3. The apparatus of claim 1 wherein said control logic further includes a plurality of drivers wherein each driver has an output coupled to a corresponding one of said plurality of control buses, an input in selective electrical communication with said serial link for receiving said information from said controller, and an enable input, said control logic being responsive to said bus selection output signals to enable the driver coupled to the selected one of said plurality of management control buses to permit transmission of at least one PHY management message to one of said PHYS on the respective control bus.

4. The apparatus of claim 3 wherein said control logic further includes a plurality of receivers, wherein each receiver has an input coupled to a corresponding one of said plurality of control buses, an output in selective electrical communication with said serial link, and an enable input, said control logic being operative in response to the identification of said PHY management message as a read operation, to selectively enable the receiver corresponding to the selected one of said plurality of control buses at a predetermined time following the initiation of said read the respective message to permit the transfer of data from a PHY coupled to the selected control bus to said controller.

5. The apparatus of claim 1 wherein said control logic is further operative to transmit a preamble over each one of said plurality of control buses for receipt by the PHYS coupled to the respective buses in response to receipt of predetermined bus selection output signals from said controller.

6. The apparatus of claim 5 further including a first state machine, wherein said first state machine is operative to analyze said bus selection output signals and to transmit said preamble over each one of said plurality of management control buses in response to receipt of first predetermined bus selection output signals from said controller.

7. The apparatus of claim 6 further including a second state machine, wherein said first state machine is operative to provide an OP Code indication signal to signal the presence of an OP Code within the respective PHY management message and said second state machine is operative to provide a command indication signal to said first state machine having a first state if said message comprises a write operation and a second state if said message comprises a read operation.

8. The apparatus of claim 7 wherein said control logic further includes a plurality of drivers and receivers, each driver and receiver having an output and input coupled respectively to a corresponding one of said plurality of control buses, an input and output respectively in selective electrical communication with said serial link for receiving and conveying information from and to said controller respectively, and an enable input, said first finite state machine being responsive to said bus selection output signals and said command indication signal to enable and disable said drivers and receivers at selected times to couple one of said plurality of management control buses to said controller to permit transmission of said information between a specified on said PHYS and said controller via the respective control bus.

9. Apparatus for performing port and PHY management in a telecommunications device comprising:
    a controller having a first bus interface and a second bus interface, said controller communicating with said second bus interface via a serial peripheral channel;

a plurality of ports, each port including at least one Media Access Controller per port and at least one PHY for coupling the respective Media Access Controller to a communications link;

said controller being coupled to said plurality of ports via said first bus interface;

a memory containing a port management control program wherein said controller is operative to execute said program to configure each of said plurality of ports and to retrieve statistics information from at least some of said plurality of ports via said first bus interface;

control logic, said controller coupled to said control logic via said second bus interface, said controller being operative to transmit information to said control logic via said second bus interface employing PHY management messages and to receive data from said control logic via said second bus interface, wherein said PHY management messages have a PHY address field comprising a predetermined number of bits;

a plurality of serial bidirectional control buses coupled to said control logic;

at least one PHY coupled to each of said plurality of control buses wherein the number of PHYS coupled to each of said plurality of management control buses is equal to or less than the number of PHYS which may be addressed using said predetermined number of address bits in said PHY management messages;

said controller being operative to produce bus selection output signals and said control logic being responsive to said bus selection output signals to selectively couple one of said plurality of serial bidirectional control buses to said second bus interface to permit message communication between said controller and a specified one of said at least one PHY coupled to the selected serial bidirectional control bus;

said controller being operative to store information corresponding to at least a portion of a PHY management message within a transmit descripter associated with said serial peripheral interface and to forward a command to said serial peripheral interface to initiate transmission of said at least a portion of said PHY management message contained in said transmit descripter to a selected PHY coupled to one of said control buses specified by said bus selection output signals via said second bus interface, wherein said transmission over said second bus interface proceeds independently of, and concurrently with, said control program execution within said controller.

10. The apparatus of claim 9 wherein said serial peripheral interface is further operative to generate an interrupt to said controller upon completion of the transmission of said at least a portion of said PHY management message.

11. A method for addressing a greater number of PHYS in a telecommunications device than may be directly addressed employing a PHY management bus message using a predetermined number of address bits for PHY addressing, said method comprising the steps of:

generating a selection signal having one of a plurality of possible signal states for selecting one control bus of a plurality of control buses as an active control bus, wherein a plurality of PHYS are in electrical communication with at least one of said plurality of control buses and at least one PHY is in electrical communication with each of said other control buses;

decoding said selection signals to select said active control bus; and addressing a message to one PHY in electrical communication with said active control bus at one PHY address of a plurality of possible PHY addresses to permit communication of information between said processor and said one PHY coupled to the active control bus.

12. The method of claim 11 further comprising the step of transmitting a PHY management message to said one of said at least one PHY in electrical communication with the coupled one of said plurality of control buses.

13. The method of claim 12 further comprising the step of transmitting a preamble over each of said plurality of control buses in the event said decoding step indicates that said selection signals have a first predetermined signal state.

14. The method of claim 11 wherein said decoding step comprises the step of generating a preamble indication signal in the event said selection signals have a first predetermined signal state, a first bus selection signal in the event said selection signals have a second predetermined signal state and a second bus selection signal in the event said selection signals have a third predetermined signal state;

transmitting a preamble over each of said plurality of control buses in response to said preamble indication signal;

coupling one of said plurality of control buses to said processor in response to detection of said first bus selection signal; and coupling another one of said plurality of control buses to said processor in response to detection of said second bus selection signal.

15. A method for concurrently managing ports and PHYS associated with said ports in a telecommunications device comprising the steps of:

executing a program within a processor having a serial peripheral interface to manage the configuration of a plurality of ports of said device and to retrieve statistical information regarding the operation of at least some of said ports;

loading a transmit descripter associated with the serial peripheral interface within said processor with information corresponding to at least a portion of a PHY management message;

initiating the transmission by said serial peripheral interface of said at least a portion of said PHY management message to a PHY coupled to a PHY control bus in electrical communication with said serial peripheral interface;

transmitting said at least a portion of said PHY management message to said PHY via said serial peripheral interface in response to said initiating step;

continuing to execute said program within said processor concurrently with said transmitting step.

16. The method of claim 15 further comprising the step of generating an interrupt to said processor from said serial peripheral interface to signal the completion of said transmitting step.

17. The method of claim 15 wherein said initiating step comprises the step of initiating the transmission by said serial peripheral interface of at least a portion of a PHY management message to a PHY coupled to a selected one of a plurality of PHY management control buses selectively coupleable to said serial peripheral interface.

* * * * *

UNITED STATES PATENT AND TRADEMARK OFFICE
CERTIFICATE OF CORRECTION

PATENT NO.   : 6,275,498 B1
DATED        : August 14, 2001
INVENTOR(S)  : Brian Bisceglia et al.

It is certified that error appears in the above-identified patent and that said Letters Patent is hereby corrected as shown below:

Column 6,
Line 40, "is" should read -- 1s --; and

Column 10,
Line 5, "said," should read -- said --.

Signed and Sealed this

Twenty-sixth Day of November, 2002

Attest:

JAMES E. ROGAN
Attesting Officer     Director of the United States Patent and Trademark Office